United States Patent [19]

Arthur

[11] Patent Number: 5,144,719
[45] Date of Patent: Sep. 8, 1992

[54] BATTERY LIFT HANDLE

[75] Inventor: Rodney I. Arthur, Port Adelaide, Australia

[73] Assignee: Rope & Marine Supplies Pty. Ltd., Port Adelaide, Australia

[21] Appl. No.: 748,439

[22] Filed: Aug. 22, 1991

[30] Foreign Application Priority Data

Aug. 29, 1990 [AU] Australia .................. PK2005

[51] Int. Cl.⁵ .......................... A47B 95/02; A45F 5/10
[52] U.S. Cl. .................................. 16/114 R; 294/154; 294/170; 294/DIG. 903
[58] Field of Search ............... 16/114 B, DIG. 15; 294/170, 153, 154, 156, DIG. 903

[56] References Cited

U.S. PATENT DOCUMENTS

| | | | |
|---|---|---|---|
| 1,552,338 | 9/1925 | Munro | 294/82.14 |
| 1,752,367 | 4/1930 | Bruton | 294/74 |
| 2,608,328 | 8/1952 | Olson | 294/154 |
| 3,464,093 | 9/1969 | Laharty | 294/82.14 |
| 4,323,273 | 4/1982 | Sword | 294/78 R |
| 4,828,310 | 5/1989 | Schmidt, Jr. et al. | 294/153 |

FOREIGN PATENT DOCUMENTS 2565411 12/1985 France ..................... 294/903

*Primary Examiner*—Robert L. Spruill
*Assistant Examiner*—Carmine Cuda
*Attorney, Agent, or Firm*—Edward W. Callan

[57] ABSTRACT

A battery lift handle which has a 'U'-shaped rigid hand grip, a lift cord extending from the base of one of the legs of the hand grip and terminates at its other end in a head, the second leg having three slots, the uppermost slot opening to one side of the second leg, the lowermost slot extending upwardly from the base and opening to the other side of the second leg, and the intermediate slot extending laterally, so that the cord head can be inserted in the second leg very quickly by a single hand action of positioning the head into the upper slot, pulling the cord through the intermediate slot and then downwardly through the lowermost slot.

6 Claims, 2 Drawing Sheets

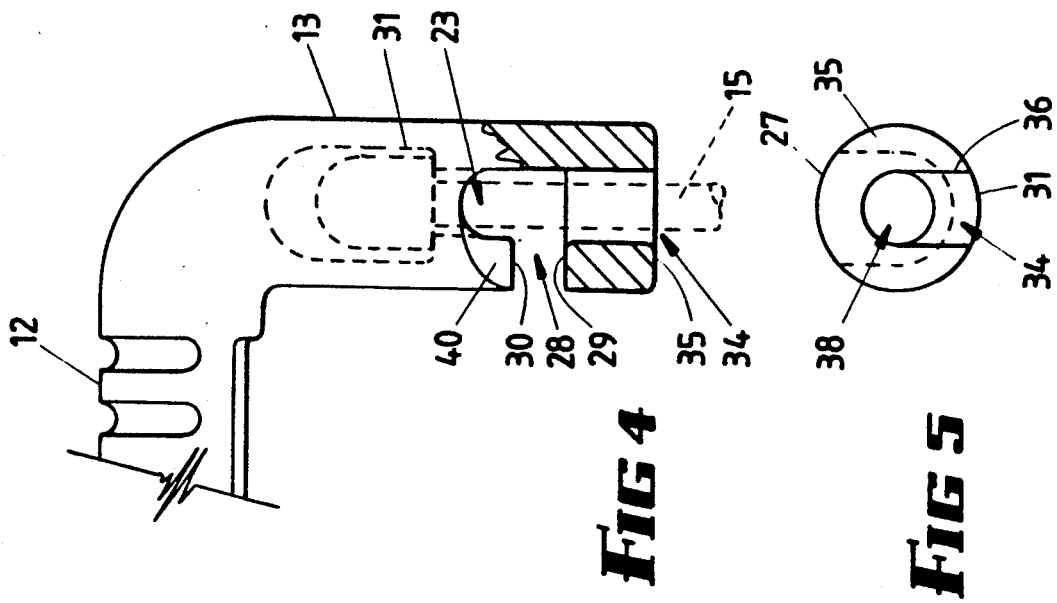
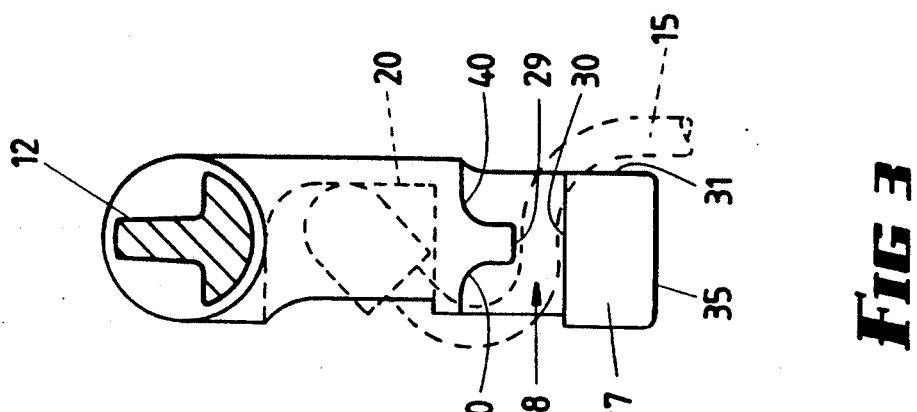
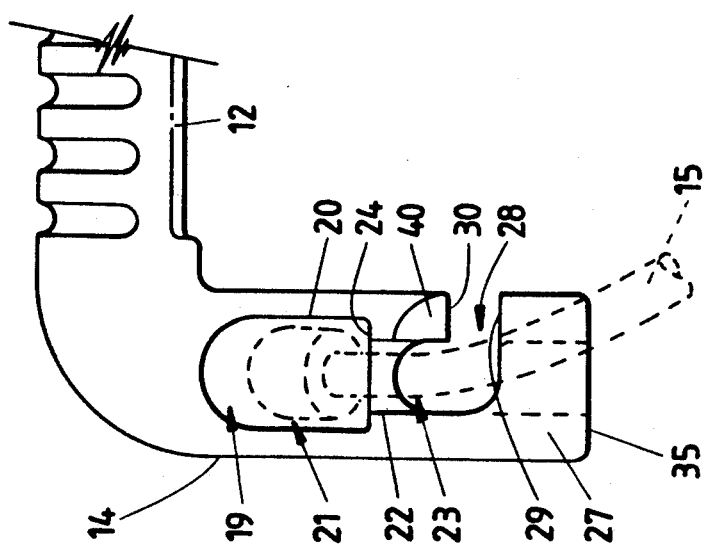

BATTERY LIFT HANDLE

This invention relates to a battery lift handle of the general type depicted in our Australian Registered Design 101145 (corresponding U.S. Design Application 07/134476).

BACKGROUND OF THE INVENTION

Battery lift handles which have the shape depicted in said design have been used commercially with considerable success, but very little time is available to an operator to assemble a battery lift handle in the manufacture of a battery. A typical cycle time is 20 seconds, and even with the improvements in said designs, that time cycle is not generally achievable. It is therefore an object of this invention to provide an improvement to the shape and configuration of a battery lift handle which will enable assembly to take place in less than that period of time, and yet which will retain a degree of security which is a prerequisite for a battery lift handle.

PRIOR ART

In addition to the aforesaid design and design application, prior art known to the applicant includes U.S. Pat. No. 1,552,338 (Munro) which illustrated a bull hook having slots at both ends to receive cables, and an enlarged opening between the slots for receiving the heads of the cables. The Bruton U.S. Pat. No. 1,752,367 illustrated a body containing a large capacity cavity to receive a head of a cable, and a slot at one end of the body to receive the cable, the slot being defined by closer surfaces than the walls of the cavity so as to provide a shelf which prevented displacement of the head.

The U.S. Pat. No. 3,464,093 (Laharty) illustrated a body wherein the head was inserted by passing it through an enlarged portion of a chamber and then through a narrower concentric portion, and displacement was inhibited by a shelf and by rubber rods.

The U.S. Pat. No. 4,323,373 (Sword) illustrated a body containing slots for entry of heads, wherein some rotational movement was applied to the cable to locate it in position, and appears to be the closest art known to the applicant.

BRIEF SUMMARY OF THE INVENTION

With the object of providing a battery lift handle which can be very quickly and easily assembled to a battery by passing the head of the lift cord through apertures in battery lugs and assembling to the slotted end of the rigid hand grip, a battery lift handle is provided with a lift cord extending from the base of one of the legs of a 'U'-shaped hand grip and terminates at its other end in a head, a second leg having three slots, the uppermost slot opening to one side of the second leg, the lowermost slot extending upwardly from the base and opening to the other side of the second leg, and an intermediate slot extending laterally, so that the cord head can be inserted in the second leg very quickly by a single hand action of positioning the head into the upper slot, pulling the cord through the intermediate slot and then downwardly through the lowermost slot.

BRIEF DESCRIPTION OF THE DRAWINGS

The claims appended hereto define the invention, but an embodiment is described hereunder in some detail with reference to and is illustrated in the accompanying drawings in which:

FIG. 2 is a side view corresponding approximately with FIG. 1 and showing in dashed lines the first stage of assembly of a headed end of a lift cord to a leg of the handle;

FIG. 3 is a section taken on plane 3—3 of FIG. 1 and showing a second stage of insertion of the lift cord end into the second leg of the handle;

FIG. 4 is a view of the opposite side of the slotted leg of the handle showing the lift cord in its final position; and FIG. 5 is a bottom view of FIG. 4.

Figure 1:
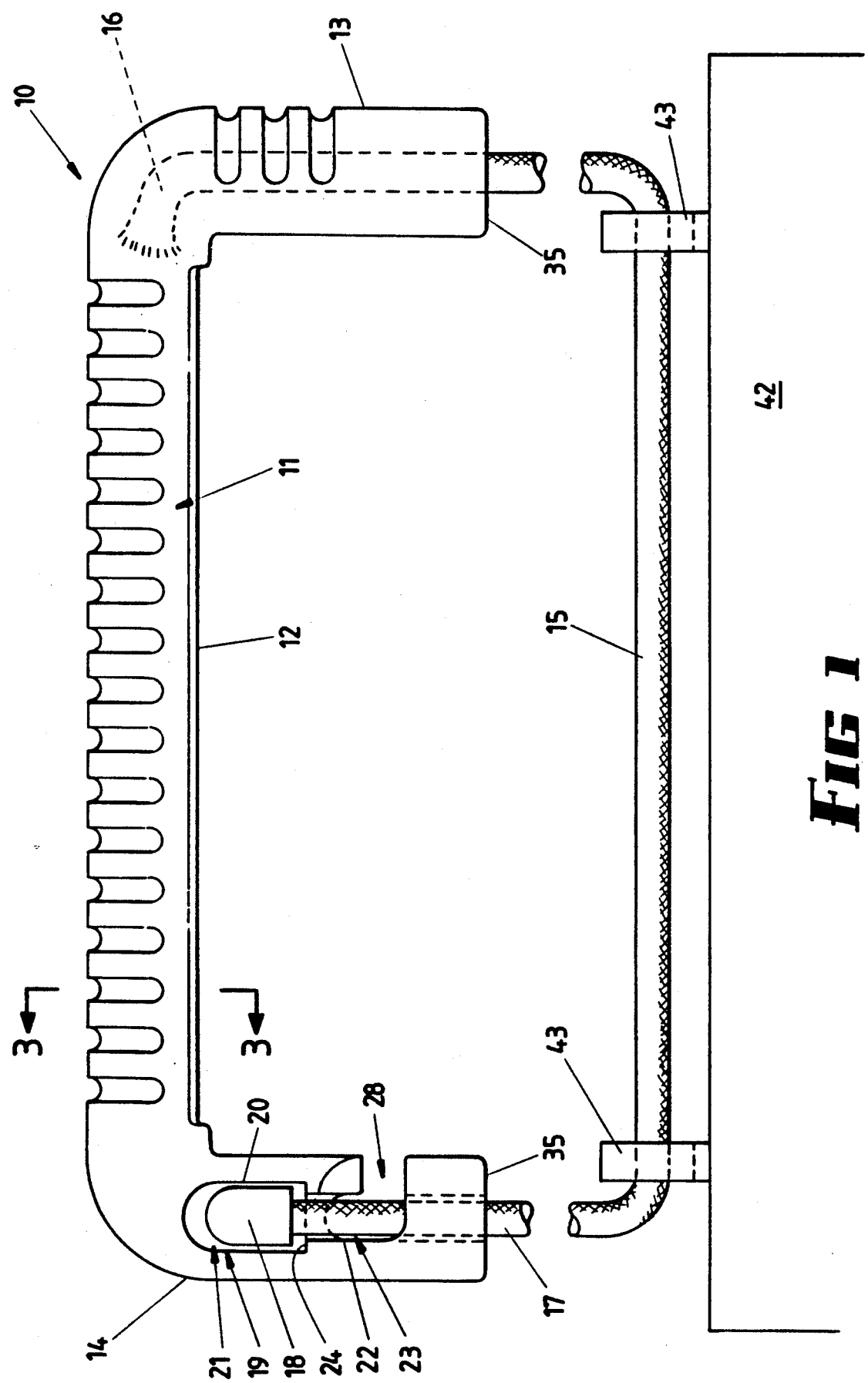
FIG. 1 is a view of a battery lift handle showing the configuration when the lift cord is assembled to one of the legs of a rigid hand grip.

In this embodiment, a battery lift handle 10 comprises a rigid hand grip 11 which is of general 'U' shape, having an horizontal portion 12 flanked by two depending legs 13 and 14, and a lift cord 15 having one end 16 embodied in the first leg 13 and the other end 17 having a head 18 thereon which engages as said below in the uppermost slot 19 of three slots.

The three slots are defined by interior surfaces, the interior surfaces 20 of the uppermost slot 19 defining an upper portion 21 which is relatively wide, and further interior surfaces 22 defining a lower portion 23 which is relatively narrow, so that between the upper portion 21 and the lower portion 23 there is a shelf 24.

Both the upper and lower portions 21 and 23 open to one side 27 of the second leg 14 as best seen in FIG. 3. Since the interior surfaces 20 and 22 include vertically extending surfaces, the uppermost slot 19 may be regarded as a "vertical slot".

The second slot 28 may be regarded as an horizontal slot, being partly defined by two lateral surfaces 29 and 30, these lateral surfaces extending the slot space of slot 28 from the side 27 to the side 31 which is opposite side 27.

The lowermost slot 34 (FIGS. 4 and 5) extends upwardly from the base 35 of the leg 14 to the lateral surface 29 so that it opens into the second slot 28 at its upper end, and as seen in FIG. 5, the slot is defined by 'U'-shaped interior surfaces 36. Since the slot 34 opens to the second side 31 and the slot 19 opens to the first side 27, in the bottom view of FIG. 5 the slots between them define a circular aperture 38 and this is a valuable security device since the cord 15 if dislodged from the slot 34 bears against portion of the interior surface 22 of the lower portion 23 of the upper slot 19.

As seen in FIG. 3, the upper lateral surface 29 of the intermediate slot 28 extends for only a short distance, and is flanked on each side by upwardly and outwardly sloping guide surfaces 40, and the shape of the depending leg 14 is such that, for assembly of the head 18 into the uppermost slot 19, it is merely necessary to place the head into the slot as shown in FIGS. 2 and 3, rotate the lift cord 15 over a guide surface 40, through the second slot 28, and then downwardly through the lowermost slot 34 to give a firm and secure engagement, and the whole operation can take place in a very short period of time. The hand grip 11 and the head 18 are formed of similar polymeric material to the lift cord 15 over the ends of which they are moulded, so that a very firm grip can be achieved, but the hand grip and head are made of relatively rigid material to simplify subsequent handling of a battery. The battery is designated 42 in FIG. 1 and the lift lugs through which the lift cable 15 extends are designated 43.

We claim:

1. A battery lift handle comprising a rigid hand grip of general 'U' shape which, in use, has a horizontal portion flanked by two depending legs,
   a lift cord having one end embodied in a first of said legs and extending from the base thereof, and a head on the other end, and
   interior surfaces defining three slots positioned along the second of said legs:
   said interior surfaces of the uppermost of the three slots including upper widely spaced and lower narrowly spaced downwardly extending surfaces opening to one side of the second leg providing an upper portion of sufficient capacity, and a lower portion of insufficient capacity, to contain said head, a shelf at the lower end of the upper portion of shape and size to retain the lift cord head in said upper portion against downward displacement from said second leg,
   the interior surfaces which define the intermediate of said slots including at least one laterally extending surface which extends slot space of the intermediate slot laterally from said lower portion of the uppermost slot on said one side of the second leg to an opposite side thereof,
   the interior surfaces which define the lowermost of said slots including a downwardly extending 'U'-shaped surface extending from said intermediate slot to the base of said second leg, and opening to said opposite side thereof.

2. A battery lift handle according to claim 1 wherein said interior surfaces which define the intermediate slot include two lateral surfaces spaced vertically from one another, the upper of those two lateral surfaces being flanked on each side by upwardly and outwardly sloping surfaces.

3. A battery lift handle according to claim 1 wherein said interior surfaces of the relatively narrow portion of the uppermost slot include a curved vertically extending portion which co-operates with a further curved portion of said 'U'-shaped slot surface of the lower slot to form an aperture in the bottom view, said curved surfaces inhibiting lateral displacement of the lift cord from said relatively narrow portion of the uppermost slot.

4. A battery lift handle according to claim 1 wherein the rigid hand grip and head are both of polymeric material sufficiently similar to the lift cord to effect a close bond between said grip and head with respective ends of the lift cord when they are moulded thereto.

5. A battery lift handle according to claim 2 wherein said interior surfaces of the relatively narrow portion of the uppermost slot include a curved vertically extending portion which co-operates with a further curved portion of said 'U'-shaped slot surface of the lower slot to form an aperture in the bottom view, said curved surfaces inhibiting lateral displacement of the lift cord from said relatively narrow portion of the uppermost slot.

6. A battery lift handle according to claim 2 wherein the rigid hand grip and head are both of polymeric material sufficiently similar to the lift cord to effect a close bond between said grip and head with respective ends of the lift cord when they are moulded thereto.

* * * * *